United States Patent [19]
Fuller et al.

[11] Patent Number: 5,302,947
[45] Date of Patent: Apr. 12, 1994

[54] METHOD AND APPARATUS FOR LOADING A SOFTWARE PROGRAM FROM A RADIO MODEM INTO AN EXTERNAL COMPUTER

[75] Inventors: Gregory W. Fuller, Boca Roton; Robert D. Fennell, Coral Springs; William J. Macko, West Palm Beach, all of Fla.

[73] Assignee: Motorola, Inc., Schaumburg, Ill.

[21] Appl. No.: 923,056

[22] Filed: Jul. 31, 1992

[51] Int. Cl.[5] ............................................. G08B 3/10
[52] U.S. Cl. ........................... 340/825.34; 340/825.44; 364/705.05
[58] Field of Search ........... 340/825.44, 311.1, 825.46, 340/825.47, 825.3, 825.34; 375/10; 364/705.01, 705.05

[56] References Cited

U.S. PATENT DOCUMENTS

| | | |
|---|---|---|
| 4,839,628 | 6/1989 | Davis et al. |
| 5,043,721 | 8/1991 | May. |
| 5,073,767 | 12/1991 | Holmes et al. ................. 340/825.44 |
| 5,166,932 | 11/1992 | Hoff et al. ..................... 340/825.44 |

OTHER PUBLICATIONS

"PC Card Standard", Release 2.0, published by Personal Computer Memory Card International Association, Sep. 1991.
"Socket Services Interface Specification", Release 1.01, published by Personal Computer Memory Card International Association, Sep. 1991.
NewsStream TM Advanced Information Receiver TM Service Manual, 6881014B05-0, published by Motorola, Inc., Jan. 1992.
NewsStream TM Advanced Information Receiver TM Operating Instructions, 6882023B98-0, published by Motorola, Inc., Jan. 1992.

*Primary Examiner*—Donald J. Yusko
*Assistant Examiner*—John E. Giust
*Attorney, Agent, or Firm*—R. Louis Breeden; Thomas G. Berry

[57] ABSTRACT

A method and apparatus in a selective call receiver (100) choose and load a software driver program (124) into an external computer (302). The apparatus comprises a data interface (118) for coupling with the external computer (302) and a memory (122) containing pre-programmed data comprising a plurality of executable software driver programs (124). The apparatus further comprises a processor (108) coupled to the memory (122) and to the data interface (118) for controlling interactions between the memory (122) and the data interface (118). The method comprises the steps of: coupling (402) the data interface (118) to the external computer (302); receiving (404) in response a signal comprising an identifier from the external computer (302); accessing (406) the memory (122) to locate a software driver program (124) compatible with the external computer (302) identified by the identifier; and transmitting (412) to the external computer (302) the software driver program (124) in response to locating the software driver program (124).

18 Claims, 2 Drawing Sheets

METHOD AND APPARATUS FOR LOADING A SOFTWARE PROGRAM FROM A RADIO MODEM INTO AN EXTERNAL COMPUTER

FIELD OF THE INVENTION

This invention relates in general to selective call receivers, and more specifically to selective call receivers having a data interface for communicating with an external computer.

BACKGROUND OF THE INVENTION

The "radio modem," i.e., a selective call receiver having a data interface for communicating with an external computer, is well known in the art. An example is the NewsStream TM Advanced Data Receiver manufactured by Motorola, Inc. of Schaumburg, Ill. This radio modem is intended for use with computers having an RS-232 port and a telecommunications program that supports a popular file transfer protocol called "XMODEM." Coupling the data interface of the conventional radio modem with such a computer allows the computer to receive information transmitted by radio and addressed to the radio modem and to store the received information in a file. Additional file access or other software is required when a user then wishes to examine or work with the information in the file.

While the conventional radio modem provides an excellent method of receiving information in a portable computer, the application software available for most portable computers does little beyond displaying information received and perhaps doing a name or telephone number look-up based on information received through the radio modem. Application software for providing vertical services that are custom tailored to the needs of various users is becoming available, but at a relatively slow pace.

An obstacle to development of vertical application software for the conventional radio modem is the lack of a consistent, high-level application interface that will remain unchanged from one brand of external computer to the next and from one model of radio modem to the next. This lack of consistency occurs because the conventional radio modem requires the application program to provide low-level drivers that are unique to each type of external computer. The low-level drivers also necessarily must be changed in response to subsequent changes in the design of the radio modem, e.g., changing from a serial data link to a parallel link between the radio modem and the external computer, or modifying low-level proprietary commands in the radio modem to add new features.

Thus, what is needed is a way of providing a consistent interface between the application software and the radio modem to facilitate the development of new and more powerful application software to support vertical services. A radio modem is needed that expands the functionality between the application software and the radio modem and that provides a consistent application programming interface from one type of external computer to the next. A radio modem that contains built-in application programs custom tailored to support a variety of user requirements is also needed.

SUMMARY OF THE INVENTION

A method chooses and loads a software driver program into an external computer from a selective call receiver comprising a data interface for coupling with the external computer and a memory containing pre-programmed data comprising a plurality of executable software driver programs. The selective call receiver further comprises a processor coupled to the memory and to the data interface for controlling interactions between the memory and the data interface. The method comprises the steps of:

(a) coupling the data interface to the external computer;

(b) receiving in response to step (a) a signal comprising an identifier from the external computer;

(c) accessing the memory to locate a software driver program compatible with the external computer identified by the identifier received in step (b); and (d) transmitting to the external computer the software driver program in response to locating the software driver program in step (c).

A selective call receiver for receiving and decoding selective call radio signals comprising information comprises a data interface for coupling with an external computer for transmitting information to the external computer. The selective call receiver further comprises a memory coupled to the data interface for allowing access to the memory by the external computer. The selective call receiver further comprises pre-programmed data stored within the memory, the pre-programmed data comprising a plurality of executable software driver programs, each of the plurality of executable software driver programs for programming at least one specific type of external computer to communicate with the data interface. The selective call receiver further comprises a computer recognition element coupled to the data interface for recognizing one of a plurality of specific types of external computer in response to signals provided to the data interface by the external computer. The selective call receiver further comprises a driver selection element coupled to the computer recognition element for selecting one of the plurality of executable software driver programs compatible with a recognized one of the plurality of specific types of external computer.

DESCRIPTION OF THE PREFERRED EMBODIMENT

Figure 1:
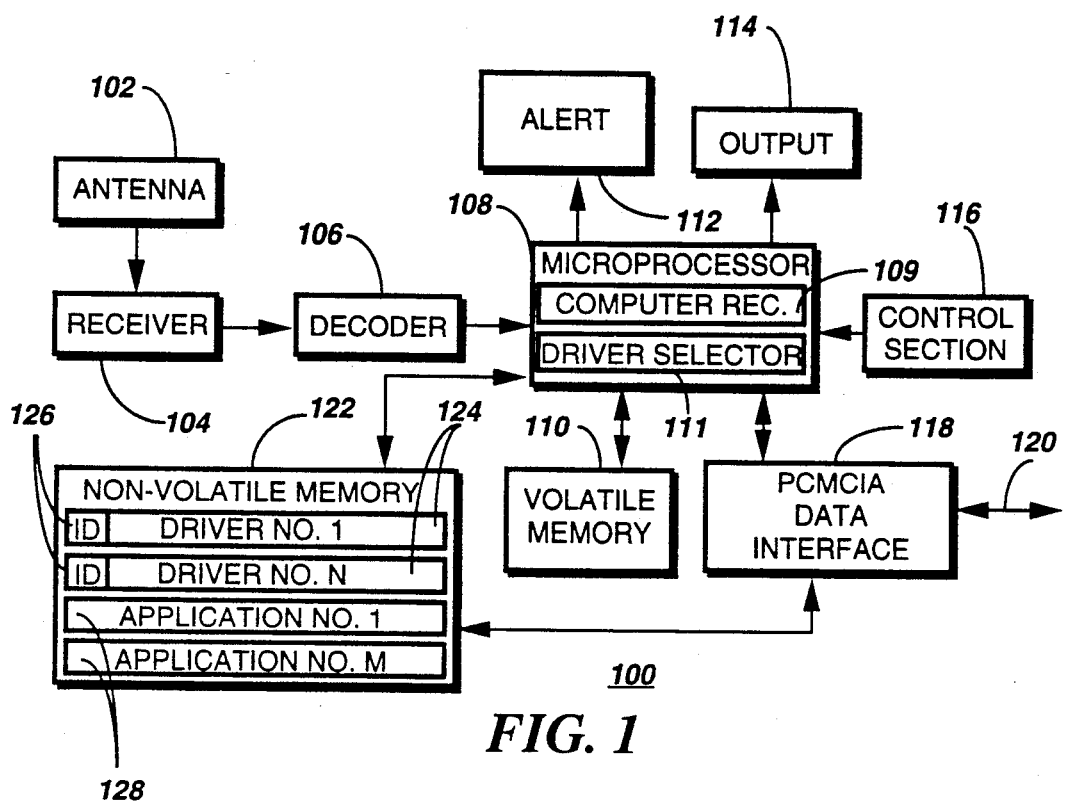
FIG. 1 is a block diagram of a radio modem in accordance with the preferred embodiment of the present invention.

Referring to FIG. 1, a block diagram of a radio modem 100 in accordance with the preferred embodiment of the present invention comprises an antenna 102 for intercepting RF signals. The antenna 102 is coupled to a receiver 104 for receiving and demodulating the RF signals intercepted. A decoder 106 is coupled to the receiver 104 for decoding demodulated information. A microprocessor 108 receives the decoded information from the decoder 106 and processes the information to recover messages. The microprocessor 108 is coupled to a volatile memory 110 for storing the messages recovered, and the microprocessor 108 controls the storing and recalling of the messages. An alert generator 112 is coupled to the microprocessor 108 for providing an audible or tactile alert to a user when the microprocessor 108 has a message ready for presentation.

An output device 114 comprises a visual display or a speaker or both, the output device 114 also being controlled by the microprocessor 108. A control section 116 comprises user accessible controls for allowing the user to command the microprocessor 108 to perform the selective call receiver operations well known to those skilled in the art and typically includes control switches such as an on/off control button, a function control, etc.

The microprocessor 108 is coupled to a non-volatile memory 122 and a data interface 118 for controlling and communicating with the non-volatile memory 122 and the data interface 118, in accordance with the present invention. The non-volatile memory 122 and the data interface 118 are also coupled to each other for providing direct communication between the non-volatile memory 122 and the data interface 118. The data interface 118 is constructed and controlled in a manner that meets the standards set forth in two documents entitled "PC Card Standard," Release 2.0, and "Socket Services Interface Specification," Release 1.01, both published by the Personal Computer Memory Card International Association (PCMCIA) in September 1991. These two documents together will be referred to hereinafter as the "PCMCIA Standard." The data interface 118 couples with external equipment, e.g., an external computer, by a PCMCIA bus 120.

The non-volatile memory 122 is pre-programmed with a plurality of software driver programs 124, each identified by an identifier 126 that identifies an external computer with which the software driver program 124 is compatible. The non-volatile memory 122 also is pre-programmed with at least one application program 128. The function of the software driver programs 124 is to compensate for the differences among external computers such that the interface between each application program 128 and the external computer when loaded with a compatible software driver program 124 is a viable interface. That is, a single application program 128 will function correctly with any of the external computers for which there exists a compatible software driver program 124.

The microprocessor 108 comprises a computer recognition element 109 for recognizing one of a plurality of specific types of external computer in response to identifier signals provided to the data interface 118 by the external computer. The microprocessor 108 further comprises a driver selector element 111 for selecting one of the plurality of software driver programs 124 compatible with a recognized one of a plurality of specific types of external computer whose identifier signals match a corresponding one of the identifiers 126.

Figure 2:
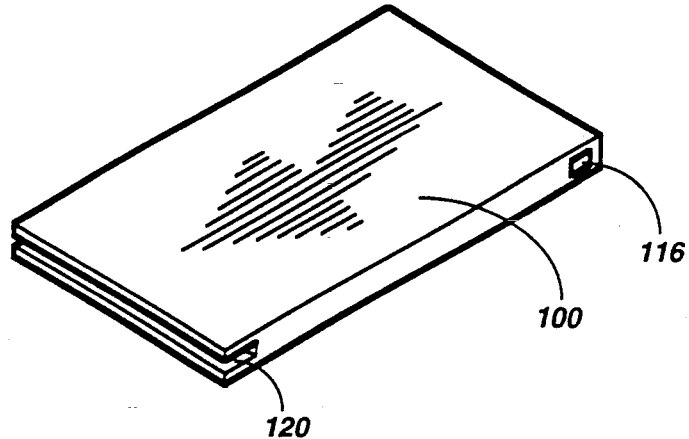
FIG. 2 is an isometric view of the radio modem in accordance with the preferred embodiment of the present invention.
Figure 3:
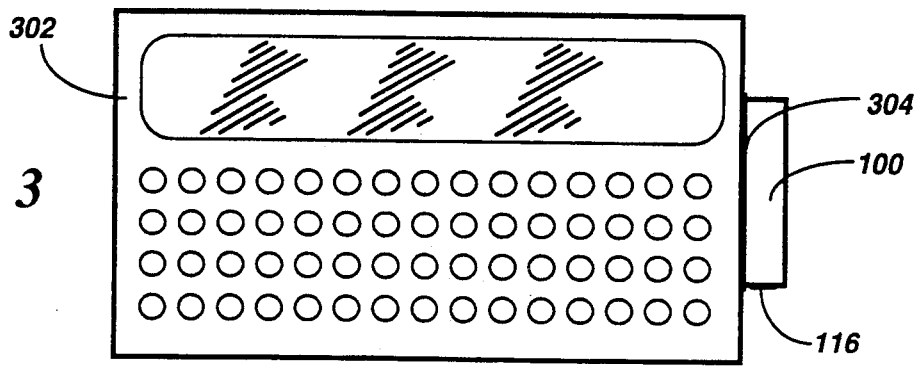
FIG. 3 is an orthographic top view of the radio modem installed in an external computer in accordance with the preferred embodiment of the present invention.

Referring to FIGS. 2 and 3, an isometric view of the radio modem 100 and an orthographic top view of the radio modem 100 installed in an external computer 302 in accordance with the preferred embodiment of the present invention shows a connector comprising the PCMCIA bus 120 at one end of the radio modem 100. When the radio modem 100 is inserted into a PCMCIA slot 304 of the external computer 302, as shown in FIG. 3, the radio modem 100 and the external computer 302 are electrically coupled by the PCMCIA bus 120, allowing communication to take place between the radio modem 100 and the external computer 302.

Figure 4:
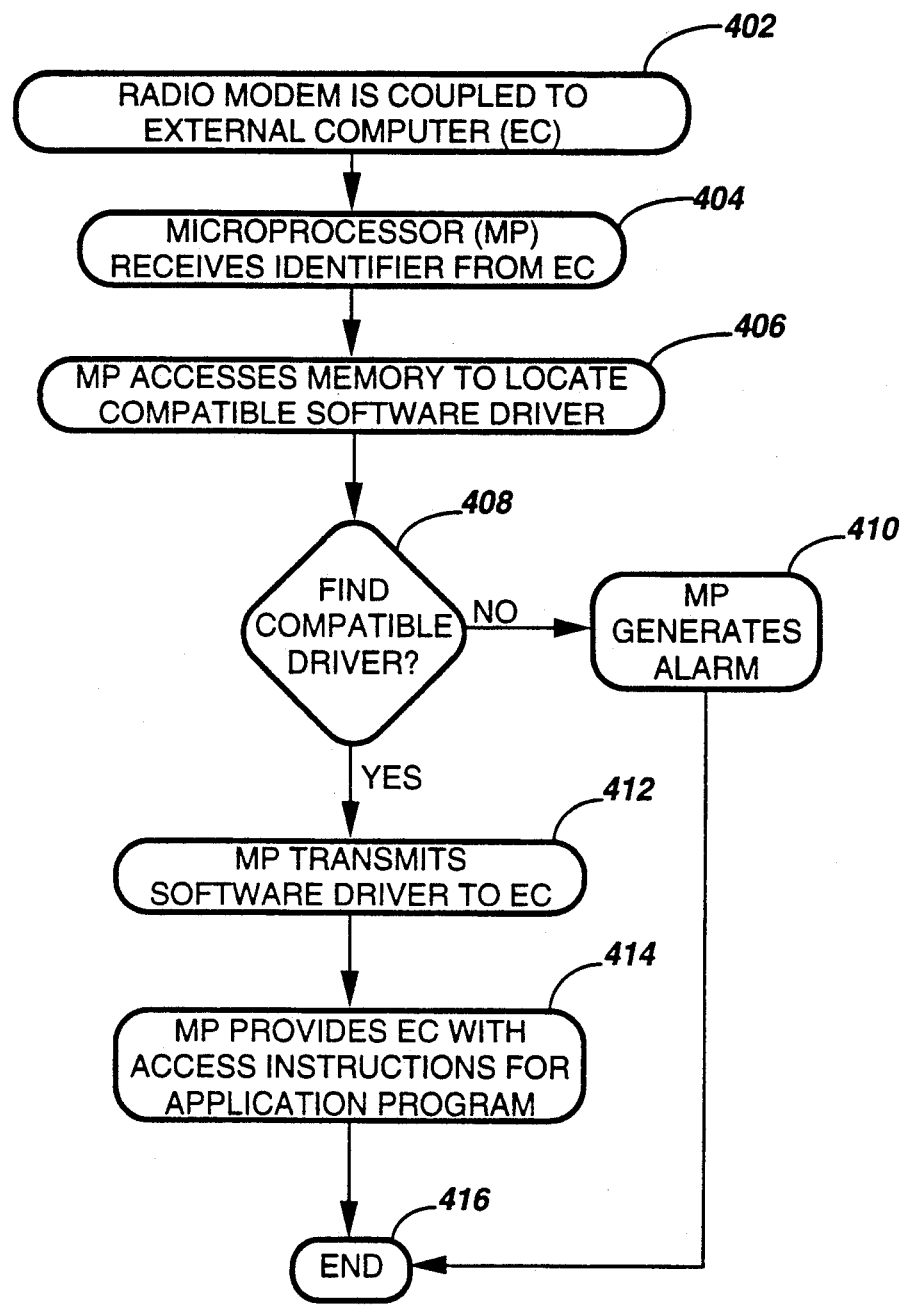
FIG. 4 a flow chart of a method of selecting and loading a software driver program and providing access to an application program from the radio modem into the external computer in accordance with the preferred embodiment of the present invention.

Referring to FIG. 4, a flow chart of a method of selecting and loading one of the software driver programs 124 (FIG. 1) and providing access to an application program 128 (FIG. 1) from the radio modem 100 into the external computer 302 (FIG. 3) in accordance with the preferred embodiment of the present invention begins with the coupling 402 of the radio modem 100 to the external computer 302. Following the coupling 402 a data exchange takes place in accordance with the PCMCIA Standard, the data exchange comprising the microprocessor's 108 (FIG. 1) receiving 404 an identifier signal from the external computer 302. In response to receiving the identifier signal, the microprocessor 108 accesses 406 the non-volatile memory 122 (FIG. 1) to locate an identifier 126 that matches the identifier signal received from the external computer 302.

In step 408 the microprocessor 108 (FIG. 1) checks to determine whether a matching identifier has been found, thus indicating the presence of a compatible software driver program 124 (FIG. 1). If the microprocessor 108 has failed to find a match, then the microprocessor 108 causes 410 the alert generator 112 (FIG. 1) to generate an alert for indicating to a user that the radio modem 100 is incompatible with the external computer 302 (FIG. 3), after which the process ends 416.

If, on the other hand, the microprocessor 108 (FIG. 1) determines in step 408 that a matching identifier 126 (FIG. 1) has been found, then the microprocessor 108 accesses 412 the non-volatile memory 122 (FIG. 1) to read and then transmit the corresponding software driver program 124 (FIG. 1) to the external computer 302 (FIG. 3) through the data interface 118 (FIG. 1) and the PCMCIA bus 120. (Alternatively, the microprocessor 108 can transmit location vectors for the corresponding software driver program 124, and the external computer can then down-load the software driver program 124 directly through the data interface 118 and the PCMCIA bus 120 without further assistance from the microprocessor 108.)

When a compatible one of the software driver programs 124 has been loaded into the external computer 302 (FIG. 3), the microprocessor 108 (FIG. 1) communicates further with the external computer 302 and provides 414 access instructions to the external computer 302 for enabling the external computer 302 to access and execute a selected application program 128 (FIG. 1), after which the microprocessor 108 ends 416 its involvement in the process.

It is important to note here that the function of the software driver program 124 (FIG. 1) is to present a consistent interface to the application program 128 (FIG. 1). The consistent interface allows each of the application programs 128 to operate compatibly with all types of external computer 302 (FIG. 3) for which there exists a software driver program 124 (FIG. 1) in the radio modem 100. This means that the application program 128 does not have to be modified in any way to make the application program 128 function with different external computers 302. The same statement applies to application programs that may reside in the external computer 302 itself. That is, once an application program has been developed for one type of external computer 302 that is compatible with one of the software driver programs 124 of the radio modem 100, the same application program will also function correctly with other types of external computer 302 that are compatible with one of the software driver programs 124 of the radio modem 100. The result is a tremendous reduction in effort required to build application support for the radio modem 100 compatible with many types of external computer 302.

Because the software driver programs 124 (FIG. 1) are part of the radio modem 100, the software driver programs 124 can be modified at the same time that future modifications are made to the radio modem 100, e.g., to add new features to the radio modem 100, etc. Such future modifications to the software driver programs 124 will be done to maintain a consistent and invariant interface for the application program 128 (FIG. 1) internal to the radio modem 100 and for any other application programs that may have been developed for external use with the radio modem 100. The maintenance of the consistent and invariant application program interface allows an increase of functionality between the application programs and the radio modem, because changing characteristics internal to the radio modem, e.g., real-time clock setting commands, message storage locations, message labels, type of microprocessor used, etc., will not affect the interface to the application programs. As a consequence, it will be possible to allow greater control of the internal features of the radio modem 100 by the application programs without the risk of massive required future modifications to the application software as a result of necessary future radio modem redesigns.

There will of course be application programs that perform operations in response to receiving decoded information from the radio modem, e.g., an application program that displays the decoded information as it is received. Greater control by application programs of internal features of the radio modem 100, however, will advantageously make it possible to provide application programs that perform operations in response to stimuli other than receiving a page, e.g., a search program for searching the memory 110 (FIG. 1) of the radio modem 100 to find a certain category of received information, the search being started in response to a user command entered from a keyboard, for example.

Furthermore, the cost savings provided by the ability to create a single application program that will operate on a plurality of external computers 302 (FIG. 3) while not requiring major modification for many years makes it feasible to develop custom-tailored application programs. For example, it will be possible to develop a special application program custom-tailored for the real estate market that would allow keyed searches of multiple listing information received by the radio modem 100.

Thus, the present invention comprises a way of providing a consistent interface between application software and a radio modem to facilitate the development of new and more powerful application software for vertical services. The present invention allows expansion of the functionality between the application software and the radio modem with minimum risk of future required modification of the application software. Also the present invention provides a consistent application programming interface from one type of external computer to the next. Furthermore, the present invention comprises a radio modem that contains built-in application programs that can be custom tailored to support a variety of user requirements, thus providing an immediately functional, turn-key operation in response to coupling the radio modem with the external computer.

We claim:

1. A method in a selective call receiver of choosing and loading a software driver program into an external computer, the selective call receiver comprising a data interface for coupling with the external computer and a memory containing pre-programmed data comprising a plurality of executable software driver programs, the selective call receiver further comprising a processor coupled to the memory and to the data interface for controlling interactions between the memory and the data interface, the method comprising the steps of:
   (a) coupling the data interface to the external computer;
   (b) receiving, from the external computer, in response to step (a) a signal comprising an identifier which identifies the external computer;
   (c) accessing the memory to locate a software drier program compatible with the external computer identified by the identifier receiver in step (b); and
   (d) transmitting to the external computer the software driver program in response to locating the software driver program in step (c).

2. The method in accordance with claim 1, further comprising the step of:
   (e) generating an alarm in response to failing to locate a compatible software driver program in step (c).

3. A method in a selective call receiver of loading an application program into an external computer and of obtaining compatibility between the external computer and the application program, the selective call receiver comprising a data interface for coupling with the external computer and a memory containing pre-programmed data comprising the application program and a plurality of executable software driver programs, the selective call receiver further comprising a processor coupled to the memory and to the data interface for controlling interactions between the memory and the data interface, the method comprising the steps of:
   (a) coupling the data interface to the external computer;
   (b) receiving, from the external computer, in response to step (a) a signal comprising an identifier which identifies the external computer;
   (c) accessing the memory to locate a software driver program compatible with the external computer identified by the identifier receiver in step (b);
   (d) transmitting to the external computer the software driver program in response to locating the software driver program in step (c); and
   (e) providing to the external computer the application program, the application program being compatible with the external computer through the software driver program transmitted in step (d).

4. The method in accordance with claim 3, further comprising the step of:
   (f) generating an alarm in response to failing to locate a compatible software driver program in step (c).

5. Selective call receiver means for receiving and decoding selective call radio signals comprising information, the selective call receiver means comprising:
   data interface means for coupling with an external computer means for transmitting information to the external computer means;

memory means coupled to the data interface means for allowing access to the memory means by the external computer means;

pre-programmed data stored within the memory means, the pre-programmed data comprising a plurality of executable software driver programs, each of the plurality of executable software driver programs for programming at least one specific type of external computer to communicate with the data interface means;

computer recognition means coupled to the data interface means for recognizing one of a plurality of specific types of external computer in response to signals provided to the data interface means by the external computer; and driver selection means coupled to the computer recognition means for selecting one of the plurality of executable software driver programs compatible with a recognized one of the plurality of specific types of external computer.

6. The selective call receiver means in accordance with claim 5, wherein the pre-programmed data further comprises a single, invariant, high-level application programming interface compatible with all the specific types of external computer that have a corresponding software driver program in the plurality of software driver programs.

7. The selective call receiver means in accordance with claim 5, wherein the pre-programmed data further comprises at least one application program comprising executable code for programming the external computer to perform operations in response to receiving decoded information from the selective call receiver means.

8. The selective call receiver means in accordance with claim 5, wherein the pre-programmed data further comprises at least one application program comprising executable code for programming the external computer to perform operations that are performed in response to stimuli other than receiving decoded information from the selective call receiver means.

9. The selective call receiver means in accordance with claim 5, wherein the data interface means comprises a PCMCIA-type interface.

10. The selective call receiver means in accordance with claim 5, wherein the pre-programmed data further comprises at least one application program comprising executable code for programming the external computer to perform operations that are customized to specific requirements of at least one category of users that have similar information processing requirements.

11. The selective call receiver means in accordance with claim 5, wherein the pre-programmed data further comprises:

a single, invariant, high-level application programming interface compatible with all the specific types of external computer that have a corresponding software driver program in the plurality of software driver programs;

at least one application program comprising executable code for programming the external computer to perform operations in response to receiving decoded information from the selective call receiver means; and at least one application program comprising executable code for programming the external computer to perform operations that are performed in response to stimuli other than receiving decoded information from the selective call receiver means.

12. A selective call receiver comprising:

a receiver for receiving radio frequency (RF) signals comprising information and for demodulating the RF signals to derive the information;

a decoder coupled to the receiver for decoding the received information and obtaining messages therefrom;

a processor coupled to the decoder for accepting the messages and for generating an alert signal in response thereto;

an alert device coupled to the processor for generating an audible or tactile alert in response to the alert signal;

a data interface for coupling with an external computer for transmitting received messages to the external computer;

a memory coupled to the data interface for allowing access to the memory by the external computer;

pre-programmed data stored within the memory, the pre-programmed data comprising a plurality of executable software driver programs, each of the plurality of executable software driver programs for programming at least one specific type of external computer to communicate with the data interface;

a computer recognition element coupled to the data interface for recognizing one of a plurality of specific types of external computer in response to signals provided to the data interface by the external computer; and a driver selection element coupled to the computer recognition element for selecting one of the plurality of executable software driver programs compatible with a recognized one of the plurality of specific types of external computer.

13. The selective call receiver in accordance with claim 12, wherein the pre-programmed data further comprises a single, invariant, high-level application programming interface compatible with all the specific types of external computer that have a corresponding software driver program in the plurality of software driver programs.

14. The selective call receiver in accordance with claim 12, wherein the pre-programmed data further comprises at least one application program comprising executable code for programming the external computer to perform operations in response to receiving decoded information from the selective call receiver.

15. The selective call receiver in accordance with claim 12, wherein the pre-programmed data further comprises at least one application program comprising executable code for programming the external computer to perform operations that are performed in response to stimuli other than receiving decoded information from the selective call receiver means.

16. The selective call receiver in accordance with claim 12, wherein the data interface comprises a PCMCIA-type interface.

17. The selective call receiver in accordance with claim 12, wherein the pre-programmed data further comprises at least one application program comprising executable code for programming the external computer to perform operations that are customized to specific requirements of at least one category of users that have similar information processing requirements.

18. The selective call receiver in accordance with claim 12, wherein the pre-programmed data further comprises:
- a single, invariant, high-level application programming interface compatible with all the specific types of external computer that have a corresponding software driver program in the plurality of software driver programs;
- at least one application program comprising executable code for programming the external computer to perform operations in response to receiving decoded information from the selective call receiver means; and
- at least one application program comprising executable code for programming the external computer to perform operations that are performed in response to stimuli other than receiving decoded information from the selective call receiver means.

* * * * *